United States Patent Office 3,441,588
Patented Apr. 29, 1969

3,441,588
POLYETHER POLYISOCYANATO BIURETS
Kuno Wagner, Otto Bayer, and Rudolf Schroter, Leverkusen, Germany, assignors to Farbenfabriken Bayer Aktiengesellschaft, Leverkusen, Germany, a corporation of Germany
No Drawing. Filed Sept. 12, 1963, Ser. No. 308,346
Claims priority, application Germany, Sept. 19, 1962, F 37,835
Int. Cl. C07c 127/24
U.S. Cl. 260—453                18 Claims This invention relates to organic polyisocyanates and more particularly to organic polyisocyanates which contain two or more biuret structures, a method for the preparation thereof, and to polyurethane plastics prepared from these organic polyisocyanates.

In German Patent 1,101,394, it has been proposed to prepare biuret polyisocyanates, for example, those having the formula:

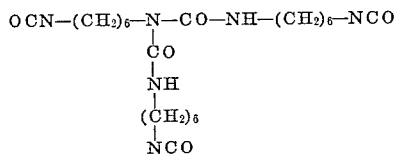

These organic polyisocyanates are prepared by reacting one mol of water or hydrogen sulphide with at least two mols of an organic diisocyanate between about 0 and 30° C. to prepare a urea diisocyanate having the formula:

OCN—R—NH—CO—NH—R—NCO

It is known that these urea diisocyanates in the nascent state can be transformed by the reaction of one mol of water or hydrogen sulphide with at least three mols of diisocyanate to polyisocyanates of low molecular weight and having the biuret structure. For the reaction product of hexamethylene diisocyanate and water, the resulting triisocyanate will have the formula set forth above.

Polyisocyanates containing a biuret structure can also be produced by reacting diamines with polyisocyanates, but the reaction takes place in an unpredictable manner; unhomogeneous products are obtained, this being quite contrary to the procedure according to German patent specification No. 1,101,394 with which amines formed by the H₂O/NCO saponification reaction are not formed in high concentration and in practice continue to react in the nascent state to form urea or biuret polyisocaynates. The production of the biuret by reacting polyisocyanates with "isolated" diamines of low molecular weight encounters considerable difficulties, especially with relatively large mixtures, since the formation of insoluble polyureas and crosslinked products is very high. At high temperatures of about 200° C., the insoluble products can be broken down by cleavage reactions, but the formation of undesirable and high colored secondary products results because the reaction mixtures are subjected to the high temperatures.

It is, therefore, an object of this invention to provide organic polyisocyanates containing a biuret structure which are substantially devoid of the foregoing disadvantages. Another object of this invention is to provide a method of preparing high molecular weight organic polyisocyanates which contain a biuret linkage and substantially no insoluble products. Another object of this invention is to provide organic polyisocyanates containing a biuret grouping which have improved solubility in organic solvents. Still another object of this invention is to provide a method of preparing organic polyisocyanates which contain biuret groupings. Another object of this invention is to provide polyurethane plastics containing a biuret grouping and ether oxygen and/or ether sulfur groupings. Still another object of this invention is to provide polyurethane coating compositions which have improved stability to light and improved resistance to degradation by organic solvents. Still another object of this invention is to provide cellular polyurethane plastics which have improved resistance to light.

The foregoing objects and others which will become apparent from the following description are accomplished in accordance with the invention, generally speaking, by providing organic polyether polyisocyanates which have biuret groupings and which are produced from ω,ω'-diamino polyethers and organic diisocyanates. These biuret derivatives preferably have the general formula:

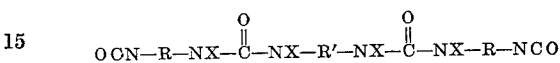

wherein R is an organic radical obtained by removing the —NCO groups from an organic diisocyanate, R' is obtained by removing the —NH₂ groups from an ω,ω'-diamino polyether and X is —CO—NX—R—NCO or hydrogen. The invention also contemplates the preparation of polyurethane plastics based on the organic polyether polyisocyanato polybiurets of the invention as more fully set forth below.

The production of organic polyether polyisocyanato polybiurets is an unexpected development in the already crowded field of polyisocyanate chemistry. It was to be expected that the polyamines would react with the polyisocyanates in a chain lengthening reaction so that high polymers were formed which contained the expected urea groups. The expected reaction would yield products that are insoluble in organic solvents and would contain the expected urea groupings resulting from the reaction of an —NCO group with a primary amino group. Contrary to the expected reaction and provided that certain conditions are met, the organic diisocyanates will react with the ω,ω'-diaminopolyethers to produce compounds which have biuret groups. The expected reaction does not occur and when using polyethers which contain predominantly thioether or oxyether groups and only two nitrogen atoms as terminal —NH₂ groups, products are obtained which have free —NCO groups and biuret linkages in addition to the thioether and oxyether groups. The new compounds result if the organic diisocyanate is used in a relatively large excess and care should be taken that the diamines in liquid form are added dropwise thereto while vigorously stirring the reaction. There may perhaps be developed better ways of making the organic polyether polyisocyanato polybiurets, but for the present, the preferred method of preparation of the new compounds involves these controlled conditions.

The products of the invention may be relatively simple derivatives set forth in the formula above or, as is more often the case, the products of the invention may be mixtures of the biuret polyisocyanates. The new polyisocyanates of relatively high molecular weight have excellent storage properties and are soluble in most organic solvents. Some of these polyisocyanates with a biuret structure are even soluble in aliphatic hydrocarbons. The products obtained by the process are preferably biuret derivatives with four to six, and preferably four free —NCO groups, to which can be given the general formula above and with which a relatively small or sometimes even a larger quantity of homologues or also secondary products are mixed.

In the formula, R represents aliphatic, hydroaromatic, araliphatic or aromatic radicals (which may possibly be substituted as in the specific isocyanates given below) and R' represents the radical of a linear or branched polyether or polythioether preferably having a molecular weight from about 200 to about 6,000, most preferably between about 800 to about 2,000, of which both terminal groups are —CH₂—, but preferably are

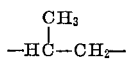

radicals.

The preferred process for the production of these polyisocyanates with a biuret structure is characterized in that about 1 mol of an ω,ω'-diamino polyether of the average molecular weight about 200 to about 6,000 is reached with at least about 3 mols of an organic diisocyanate at a temperature above about 15° C.

In a most preferred embodiment, the diisocyanates are used in at least approximately sixfold excess, i.e., 20 mols and higher per mol of ω,ω'-diamino polyether, and thus serve simultaneously as solvent in the reaction. The products of the process exist at least initially as a solution in monomeric organic diisocyanates.

Any suitable ω,ω'-diamino polyether may be used for the process of the invention including the following:

(1) Polypropylene glycol ethers with terminal NH₂— groups and a molecular weight 200 to 6,000 advantageously those having the molecular weight 800 to 2,000.

(2) Copolymers of ethylene oxide, propylene oxide or styrene oxide or their sulphur-containing homologues, which may be transformed by subsequent reaction with propylene oxide into polyethers with substantially secondary hydroxyl groups and thereafter are converted into the diamines by the process of copending application Ser. No. 294,176, now abandoned. According to the process there disclosed, polyhydric polypropylene ethers having amino groups are prepared by reacting a polyhydric polypropylene ether with ammonia in the presence of a hydrogen transferring catalyst to prepare an organic primary diamine. The polyhydric polypropylene ethers preferably have a molecular weight of about 200 to about 5,000. The ammonia may be substituted with other amines such as, for example, aniline, cyclohexylamine, propylamine, butylamine, toluidine and the like. Any suitable hydrogenation catalyst may be used such as, for example, Raney nickel, Raney cobalt, nickel fullers earth, nickel or cobalt catalyst absorbed on a support such as the molecular sieve, silica gel or the like; copper chromite, palladium, platinum and the like. Of course, catalytic amounts of the catalysts are contemplated usually from about .1 percent to about 10 percent by weight of the polyether. It is preferred to separate out the catalyst and excess ammonia as more fully set forth below.

(3) Tetrahydrofuran polymers, the primary OH-groups of which are transformed by subsequent reaction with propylene oxide substantially into secondary —OH groups and are converted according to No. 2 into diamines.

(4) Polythioethers of thiodiglycol or thiodiglycol and other polyfunctional alcohols, which are transformed according to No. 2 into diamines.

(5) Addition products of ethylene oxide, propylene oxide, or the sulphur homologues and polyfunctional aliphatic, cycloaliphatic or araliphatic polyalcohols, which are converted according to No. 2 into polyamines.

(6) Addition products of ethylene oxide, propylene oxide or the sulphur homologues and polyhydric phenols or aromatic polyamines, such as resorcinol, 1,5-dihydroxynaphthalene, hydroquinone, aniline, m-toluidine, xylidine and isomers, which are transformed according to No. 2 into diamines.

(7) ω,ω-Diamino polyethers according to 1 to 6, which are converted by reaction with bifunctional chloroformic acid esters, for example with

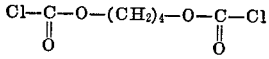

into ω,ω'-diamino polyesters comprising urethane groups and having an average molecular weight of about 400 to about 6,000. When using such ω,ω'-diamino polyethers comprising urethane groups, in addition to biuret groups being formed in the process according to the invention, allophanate groups are also formed to a lesser extent.

(8) ω,ω'-Diamino polyethers according to 1 to 6 which are transformed by reaction with less than equivalent quantities of urea at temperatures around 100 to 200° C. into ω,ω'-diamino polyethers comprising urea groups and having the average molecular weight of about 400 to about 6,000.

(9) Reaction products of polypropylene glycols with excess quantities of urea, ω,ω'-diamino polyethers comprising urea groups likewise being formed by splitting off ammonia and decarboxylation reactions.

The ω,ω'-diamino polyethers preferably have the formula:

wherein X is an organic radical containing hetero atoms which are preferably oxygen or sulphur atoms and repeating alkylene groups. The radicals represented by X may also contain in addition to the hetero oxygen and sulphur atoms, urethane groups, urea groups and the like. X is preferably a polypropylene oxide radical so the most preferred compound has the formula

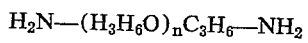

wherein n is sufficient to give a molecular weight of about 800 to about 2,000 for the whole compound.

Without causing any particular disturbance of the course of the reaction, it is also possible to employ ω,ω'-diamino ethers which contain small proportions of secondary amino groups within the chain. Disturbances when carrying out the process according to the invention due to development of more difficultly soluble products can occur if the ω,ω'-diamino polyethers used contain ammonia or relatively large quantities of metal catalysts used in the production of the diamino polyethers have not been removed. In such cases, it is advisable to drive off ammonia at high temperature and to remove the metal catalysts by filtration or by adsorption on ion exchangers.

Especially suitable as monomeric organic diisocyanates for the process according to the invention are 1-methylbenzene-2,4-diisocyanate, 1-methylbenzene-2,6-diisocyanate and their industrial mixtures, 1-methoxybenzene-2,4-diisocyanate, 1-chlorobenzene-2,4-diisocyanate and their alkyl-substituted derivatives. Diphenylmethane-4,4'-diisocyanate, p-phenylene diisocyanate, m-penylene diisocyanate, hexamethylene diisocyanate, cyclohexylene-1,4-diisocyanate, dicyclohexyl-4,4'-diisocyanate tetramethylene diisocyanate, diisocyanatomethyl cyclobutane and 1,3-bis-(γ-isocyanatopropoxy)-2,2-dimethylpropane are also mentioned.

It is particularly emphasized that the process according to the invention can also be carried out smoothly with those diisocyanates which, perhaps from the production stage, contain triisocyanates admixed therein and in which the proportion of the components of higher function can even amount to 30–50 percent.

The process can also be carried out when using neutral organic solvents, whether the solvents are used for diluting the isocyanates or even the diamines introduced in measured quantities into the isocyanates. The chain-extending reaction can also be influenced by the quality of the solvent, and chain-extending reactions can be suppressed when using particularly good solvents.

Benzene, toluene, chlorobenzene, o-dichlorobenzenes, butyl acetate, ethylene glycol monomethyl ether acetate, methyl ethyl ketone, chloroform and methylene chloride are for example suitable as solvents.

When carrying out the preferred process, the solubility of the ω,ω'-diamino polyethers in the monomeric diisocyanate should be allowed for, since otherwise disturbances can likewise occur. When reacting ω,ω'-diamino polyethers with aliphatic or hydroaromatic diisocyanates, it is desirable in many cases to work in inert organic diluents such as benzene, ethyl acetate, methyl ethyl ketone, ethylene glycol monoethyl ether acetate, xylene or the like so that the ω,ω'-diamino polyethers added dropwise to the organic diisocyanates are quickly dissolved and better distributed, whereby more especially chain-extending reactions and relatively strong increases in viscosity of the reaction mixtures can be avoided. For certain uses, however, a certain increase in viscosity may be desirable. This increase in viscosity can be obtained by carrying out the reaction more quickly and by varying the solubility of the reactants by changing the solvents, so that it is possible without cross-linking reactions occurring to obtain polyisocyanates which contain biuret groups and of high viscosity and in which several polyether radicals have a linear linkage.

According to the preferred form of the process, the ω,ω'-diamino polyethers are preferably reacted in a low concentration and while stirring vigorously with the diisocyanates, the diamines in liquid form or diamines melting below about 100° C. being introduced dropwise, as such or dissolved in inert organic solvents, into the vigorously stirred, liquid, monomeric diisocyanates preferably heated to about 80 to about 100° C. Care should be taken at this time that the speed of descent of the drops through the vapor zone of the reaction vessels is high and separate drops do not flow towards the diisocyanates along the walls of the vessel in the form of concentrated films, since otherwise a pronounced lengthening of the chain and thus a formation of difficultly soluble products is caused because of unfavorable concentration ratios. If diisocyanates are used which have an appreciable vapor pressure at about 80 to about 100° C., it is often advantageous for the vapor chamber to be continuously flushed with an inert gas such as nitrogen, argon or the like in order to keep the isocyanate vapor concentration as low as possible during the free descent of the diamine droplets which are to be introduced. If the procedure described is used, for example, with the dropwise introduction of about 200 parts by weight of an ω,ω'-diamino polypropylene glycol polyether of average molecular weight about 2,000 at a speed of about 1.7 cc./minute into about 400 parts by weight of hexamethylene diisocyanate (which is kept at a temperature of about 80 to 100° C.) an immediate conversion to biuret polyisocyanates is obtained by way of the urea diisocyanate formed. This continues to react very readily in its nascent state, so that the biuret formation is evident at about 40° C. and proceeds almost quantitatively at about 80° C. It is surprising that there is no appreciable rise in viscosity of the reaction mixtures with this method and also that there is no substantial formation of insoluble cross-linked polyureas, if the diamine is carefully added to the diisocyanate. Even when the excess monomeric diisocyanate is removed, for example by vacuum distillation of the diisocyanate which takes a relatively long time, so that the biuret polyisocyanate containing free —NCO groups is subjected to heat for a relatively long period, no deposition of gel-like fractions occur. In addition, there is no subsequent formation of insoluble polymers if the distillation is carried out in appropriate manner (e.g., thin-film evaporators). Syrupy, colorless to golden yellow monomer-free biuret polyisocyanates are obtained, which are completely clear and transparent and have an excellent solubility in most organic solvents. On account of their high stability and their low tendency to change into insoluble polyisocyanurates under further heating, these products can be freed from monomeric diisocyanates by special methods to below 0.5 percent monomeric starting diisocyanate in a film-like evaporator as such or with the aid of sprayed inert organic solvents such as chlorobenzene, o-dichlorobenzene, aliphatic hydrocarbons or by extraction methods, for example, with the aid of aliphatic hydrocarbons of higher boiling point. By analysis of the practical monomer-free products, it is possible to obtain an insight into the constitution of the reaction products. The —NCO number found in most products has a good conformity with the theoretical —NCO number of biuret derivatives containing four —NCO groups (see Example 1).

The excellent yield and easy production of these new polyisocyanates with a biuret structure, while completely avoiding the development of cross-linked products, was not to be expected on the basis of previous experience. According to the opinions formerly prevailing, a gel formation and cross-linking occurs more easily when reacting polyfunctional systems as the polyfunctional radical is of higher molecular weight. It is consequently probable that the easy and disturbance-free formation of the products of the process, while avoiding cross-linking reactions and appreciable chain-extending reactions, is achieved because the ω,ω'-diamino polyethers of higher molecular weight have a favorable degree of agglomeration, whereby the —NH₂ group experiences a steric protection and furthermore products transformed into biuret polyisocyanates are prevented by steric protection from further reacting with fresh diamines so that chain lengthening and cross-linking occur.

According to one preferred form of the invention, it is possible first of all to react the ω,ω'-diamino polyether with an excess of diisocyanate (about 3–4 mols per mol of polyether) at low temperatures, i.e. at or below room temperature (about minus 5 to about 20° C.), whereby intermediate products containing urea groups are formed due to a linear chain extension, and these intermediates, possibly with addition of more diisocyanate, are then transformed at higher temperature i.e. from about 30° C. but more preferably at about 80° C. to about 160° C. into polyisocyanates with a biuret structure.

The process according to the invention can also be carried out in the presence of relatively small quantities of compounds of low molecular weight containing reactive hydrogen atoms, for example, saturated or more especially also unsaturated bifunctional alcohols, such as monoallyl glycerine ether,
2,3-butenediol,
bis-hydroxyethyl methacrylamide,
aromatic diamine such as p-aminoaniline,
4,4-toluylene diamine,
2,6-toluylene diamine,
4,4'-diamino diphenylmethane and the like, hydroxy ethylated ureas or linear polyethers comprising hydroxyl groups such as polypropylene ether glycol, molecular weight 2,000 and the like.

In a modification of the process according to the invention, the ω,ω'-diamino polyethers are initially reacted with about 2 mols of a monoisocyanate, e.g., phenylisocyanate, p-tolylisocyanate or cyclohexylisocyanate or the like at room temperature of about 15 to 30° C. or above. In this way, the corresponding ω,ω'-bis-urea polyethers are formed. These are then transformed at a temperature above room temperature with at least about 2 mols of diisocyanate but advantageously with a large excess of diisocyanate which, as described, serves in practice as a solvent, into a polyisocyanate with a biuret structure, in this case a diisocyanate with a biuret structure.

The new polyisocyanates with a biuret structure in the pure state or in a crude state, i.e., mixed to a greater or lesser extent with polyisocyanates of a biuret structure and comprising urea groups and/or urethane groups, or with urea polyisocyanates or polyether urethane polyisocyanates and also the solutions of the products of the process in monomeric organic diisocyanates are valuable starting materials for the production and modification of polyurethane plastics. Also, the biuret derivatives of aliphatic, cycloaliphatic and araliphatic diisocyanates constitute high-grade starting materials especially for the production of light-fast lacquer coatings and also light-fast foam material. Similarly, derivatives of the biuret derivatives of higher molecular weight and containing for example four —NCO groups, perhaps in the form of their reaction products with ammonia, their N- methylol compounds or their alkyl ether derivatives, constitute valuable synthetic resins which can be crosslinked with formaldehyde or agents splitting off formaldehyde. Furthermore, unsaturated derivatives of these biuret polyisocyanates, such as for example reaction products with allyl alcohol or hydroxyethyl methacrylamide, are valuable synthetic resins, which can be for example vulcanized by means of peroxide or with sulphur. With phenols, caprolactam, pyrrolidone, malonic esters, acetoacetic esters and benzimidazole, the biuret polyisocyanates of higher molecular weight can be transformed into masked isocyanates which can be used for the crosslinking of polyurethane compositions of high molecular weight.

The invention is most useful for the preparation of polyurethane plastics by reaction of these new organic polyether polyisocyanato polybiurets with an organic compound containing active hydrogen containing groups as determined by the Zerewitinoff method.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —COOH, —SH and the like. Examples of suitable types of organic compounds containing at least two active hydrogen containing groups which are reactive with an isocyanate group are hydroxyl polyesters, polyacetals, polyhydric polyalkylene ethers, polyhydric polythioethers, aliphatic polyols, including alkane, alkene and alkyne diols, triols, tetrols and the like; aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds which contain one —SH group and one —OH group or two —OH groups and one —SH group as well as those which contain an amino group and an —SH group and the like may be used.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5,000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethyl-succinic acid, trimellitic acid, trimesic acid, mellophanic acid, prehnitic acid, isophthalic acid, terephthalic acid, hemimellitic acid, benzenepentacarboxylic acid, 1,4-cyclohexanedicarboxylic acid,
3,4,9,10-perylenetetracarboxylic acid and the like.

Any suitable polyhydric alcohol may be used such as, for example, ethylene glycol,
1,3-propylene glycol,
1,2-propylene glycol,
1,4-butylene glycol,
1,3-butylene glycol,
1,2-butylene glycol,
1,5-pentane diol,
1,4-pentane diol,
1,3-pentane diol,
1,6-hexane diol,
1,7-heptane diol,
glycerine,
trimethylol propane,
1,3,6-hexane triol,
triethanolamine,
pentaerythritol,
sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers, Inc. (1951), or in U.S. Patent 1,922,459.

Any suitable polyhydric polythioether may be used such as, for example, the condensation product of thiodigylcol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amino alcohol or amine in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyester.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentanediol-1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentane-1,5-diol, 2-hexene-1,6-diol, 2-heptane-1,7-diol and the like; alkyene diols such as, for example, 2-butene-1,4-diol, 1,5-hexadiyne-1,6-diol and the like; alkane triols such as, for example, 1,3,6-hexanetriol, 1,3,7-heptane triol, 1,4,8-octane triols, 1,6-12-dodecane triol and the like; alkene triols such as, 1-hexene-1,3,6-triol and the like; alkane tetrols such as, for example, 1,2,5,6-hexane tetrol and the like; alkyne tetrols such as for example, 4-octyne-1,2,7,8-tetrol and the like; alkene tetrols such as, for example, 3-heptane-1,2,6,7-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamide may be used for example, aromatic polyamines such as, for example, p-amino aniline, 1,5-diamino naphthalene, 2,4-diamino toluylene, 1,3, 5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis(2-hydroxy propyl)ethylene diamine, as well as compounds of any of the classes set forth which are substituted with halogen such as, for example, chloro, iodo, bromo and the like; nitro; alkoxy, such as, for example, methoxy, ethoxy, propoxy, butoxy, and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphate and the like.

It is also possible to use polyphosphites or alkoxylated phosphoric acids such as, for example, those disclosed in U.S. Patents 3,009,939 and 3,061,625.

The polyisocyanates of the invention are useful for the preparation of cellular polyurethane plastics by reaction thereof with an active hydrogen containing compound in the presence of a blowing agent. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of oragnic polyioccyanate is reacted in a first step with the polyol of the present invention to prepare a prepolymer having free —NCO groups which is then reacted in a second step with water to prepare a foam. Alternately, the components may be reacted in a single working step. Furthermore, instead of water, low boiling hydrocarbons such as pentane, hexane, heptane, pentene and the like; azo compounds, halogenated hydrocarbons such as, dichloro difluoromethane, trichlorofluoromethane, dichlorodifluoroethane, vinylidene chloride and the like may be used as blowing agents. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxy alkylene black copolymer. The latter type of silicone oil is disclosed in U.S. Patent 2,834,748. Where polyhydric polyalkylene ethers are included in the reaction mixture to prepare a cellural polyurethane plastic, it is preferred to employ a silicone oil of the above patent within the scope of the formula

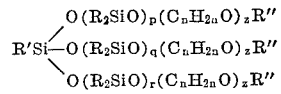

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

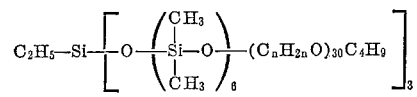

wherein $(C_nH_{2n}O)$ is a mixed polyoxethylene and oxypropylene block copolymer containing about 17 oxyethylene units and about 13 oxypropylene units.

Any suitable catalyst may be used to speed up the reaction if desired such as, for example, dimethyl benzylamine, dimethylstearyl amine, permethylated diethylene triamine, N-methyl-N'-dimethylaminoethyl piperazine, N, N'-endoethylene piperazine, N-alkyl morpholines; tertiary aminoethers such as, for example, 1-alkoxy-3-dialkylamino-propane, tertiary amines with ester groups, salts of tertiary amines, especially with oragnic acids such as, for example, oleic acid, benzoic acid, and the like, dibutyl tin dilaurate, dibutyl tin di-2-ethyl hexoate, dibutyl-tin-bis-(dimethylamino caproate), stannous octoate, lead naphthenate, ferric actylacetonate, mixtures thereof and any other catalyst which will promote the reaction between isocyanate groups and active hydrogen atoms as determined by the Zerewitinoff method as those disclosed in "Catalysis of the Isocyanate-Hydroxyl Reaction," J. W. Britain and P. G. Gemeinhardt, Journal of Applied Polymer Science, vol. IV, Issue No. 11, pp. 207–211 (1960).

The polyisocyanates of the invention may also be used for the production of coating compositions. In this case, the organic compound containing active hydrogen containing groups is reacted with the polyisocyanates of the invention in an inert organic solvent therefor, such as, for example, methyl formamide, the diethyl ether of diethylene glycol, benzene, xylene, benzine and the like.

It is also possible to use the polyisocyanates of the invention in the preparation of elastomeric products which are nonporous for example by reacting an organic compound containing active hydrogen containing groups with an excess of the polyisocyanate of the invention in a first step to prepare an isocyanato-terminated prepolymer under anhydrous conditions. This prepolymer is then reacted in a second step with a chain extending agent such as, for example, 1, 4-butane diol, 1, 3-butane diol, the bis-beta-hydroxy ethyl ether of hydroquinone, water or the like by mixing the crosslinking agent with the prepolymer and casting the resulting mixture in a mold.

The polyurethane plastics of the invention are useful where polyurethanes have been used heretofore. For example, the foams are useful for cushions and especially rigid foams are useful for both sound and thermal insulation, for example, for walls of buildings. The coatings may be used to coat wood or metals such as steel and the like. The elastomers are useful, for example, for the production of tires or for molded items such as gear wheels or the like.

The invention is further illustrated by the following examples in which parts are by weight unless otherwise specified.

EXAMPLE 1

About 400 parts of freshly distilled hexamethylene diisocyanate are heated to about 95° C. While stirring well, and in the course of about 3 hours, about 200 parts of a mixture of about 80 percent of $\omega,\omega'$-diamino propylene glycol polyether with an $NH_2$ content of 1.38 percent and an average molecular weight of about 2,400 and about 20 percent of a mixture consisting of $\omega,\omega'$-dihydroxypropylene glycol polyether and $\omega,\omega'$-hydroxy-$\omega'$-amino propylene glycol, polyether with an —OH content of 0.8 percent and an —$NH_2$ content of 0.6 percent are added dropwise. The addition is effected in extremely fine droplets and the dropping height thereof is 40 cm. Care is taken that the droplets fall into the stirring cone of the reaction mixture without coming into contact with the walls of the vessel. The speed of the addition is about 1.1 cc./min. At this speed to dropwise introduction, the reaction mixture remains clear and there is no deposition of sparingly soluble polyureas or gellike components. The reaction is completed after about 3 hours. A clear solution is obtained consisting of biuret polyisocyanates and biuret polyisocyanates containing urethane groups, as well as small fractions of polyether urethane diisocyanates, in excess hexamethylene diisocyanate. The solution obtained is stirred vigorously several times with aliphatic hydrocarbons (B.P. 200–260° C.) and monomeric diisocyanates and polyether urethane diisocyanates are hereby removed, the bottom layer containing biuret polyisocyanates is separated out and the hydrocarbons are removed in the thin-film evaporator under high vacuum. A syrupy yellow liquid (—NCO content 5.1%) is obtained. For a biuret derivative with four —NCO groups, the calculated content with an average molecular weight of 2,400 is 5.5% —NCO. The solution obtained therefore consists, prior to the removal of the excess diisocyanate and according to the results of the fractionation, of a relatively large proportion of about 34% of biuret polyisocyanates of relatively high molecular weight and of about 7% of polyisocyanates with biuret structure comprising polyether urethane polyisocyanates or urethane groups.

EXAMPLE 2

The procedure of Example 1 is followed, but the reaction is initially carried out at 15° C. Under these more gentle temperature conditions, there is obtained substantially a solution which contains about 34% of polyether diisocyanates with urea groups with only small quantities of polyisocyanates with biuret structure. The —NCO content of the mixture is 31.3%. By raising the temperature to 60° C., the —NCO content of the solution falls after about 4 hours to about 30.5% and the proportion of polyisocyanate having a biuret structure in the mixture rises, based on the polyether diisocyanates with urea groups, to 1:1. Further heating with exclusion of moisture leads to an —NCO content of 29.8% and to an almost quantitative formation of polyisocyanates having a biuret structure.

EXAMPLE 3

About 1,600 parts of 1-methyl benzene-2,4-diisocyanate are heated to about 95° C. While stirring well, and using the procedure of Example 1, about 800 parts of a mixture consisting of about 80% of $\omega,\omega'$-diamino propylene glycol polyether with an —$NH_2$ content of about 1.38% and an average molecular weight of about 2,400 and about 20% of a mixture consisting of about 8% $\omega$-amino-$\omega'$-hydroxypropylene glycol polyether with an —$NH_2$ content of about 0.8% and about 12% of an $\omega,\omega'$-dihydroxypropylene glycol polyether with an —OH content of about 1.4% are introduced dropwise into the initially supplied 1-methyl-benzene-2,4-diisocyanate. After about four hours, the dropwise addition and the reaction are completed. A clear solution is obtained consisting of polyisocyanates with a biuret structure and comprising urethane groups and polyether urethane diisocyanate in 1-methylbenzene-2,4-diisocyanate. The —NCO content of the solution is about 29.95%. Proportion of biuret polyisocyanate, determined by the method of purification in Example 1, about 35% of tetrafunctional isocyanates.

EXAMPLE 4

The procedure according to Example 3 is followed, but the 1,600 parts of 1-methylbenzene-2,4-diisocyanate are replaced by about 1,600 parts of a diisocyanate mixture consisting of about 30% of 1-methylbenzene-2,6-diisocyanate and about 70% of 1-methylbenzene-2,4-diisocyanate. The temperature control of the reaction, the dropping speed of the polyether mixture and the reaction period are as in Examples 1 and 3. There is obtained a clear solution of polyisocyanates with a biuret structure, polyisocyanates with a biuret structure and containing urethane groups and polyether urethane diisocyanates in excess diisocyanate. The —NCO content of the solution is 29.4 and the biuret polyisocyanate proportion about 40.8%.

EXAMPLE 5

About 640 parts of a liquid polyisocyanate mixture are heated to about 100° C. The polyisocyanate mixture has an —NCO content of 31.4% and consists of approximately about 60% of diphenylmethane-4,4-diisocyanate, diphenylmethane-2,4-diisocyanate and diphenylmethane-2,2-diisocyanate, and also of about 25% of homologous triisocyanates and finally of about 15% of polyisocyanates of higher function, such as tetraisocyanates, pentaisocyanates and hexaisocyanates with aromatic groups, which are linked at the o-position and p-position to the —NCO group on the benzene ring by way of methylene groups. About 200 parts of the polyether mixture used in Example 1 are introduced dropwise into the hot polyisocyanate by the method disclosed in Example 1. After completion of the reaction, a clear solution is obtained which is free from cross-linked polyureas and has an —NCO content of about 22.7%. Biuret polyisocyanate proportion: about 27%.

EXAMPLE 6

About 400 parts of diisocyanatomethyl cyclobutane and about 400 parts of benzene are heated to about 70° C. While stirring well and using the procedure of Example 1, about 200 parts of the polyether mixture used in Example 1 are added. After about 3 hours, benzene is removed in vacuo and the reaction mixture is heated for about one hour at about 120° C. There is obtained a clear solution of polyisocyanates with a biuret structure and comprising urethane groups and polyether urethane diisocyanates in diisocyanatomethyl cyclobutane. The —NCO content of the solution is about 29.1%, the biuret polyisocyanate proportion about 35%.

EXAMPLE 7

About 100 parts of an $\omega,\omega'$-diamino propylene glycol polyether (average molecular weight about 1,000; —$NH_2$ content about 3.2%) are reacted with the equivalent quantity of phenyl isocyanate (about 23.8 parts) to the corresponding $\omega,\omega'$-diurea. The reaction is carried out at about 40° C. by dropwise addition of the phenyl isocyanate to the initially supplied diamine. Thereafter, the liquid clear reaction product is mixed with about 200 parts of hexamethylene diisocyanate and heated while stirring to about 130° C. After a reaction period of about 2 hours, the substance is distilled off under high vacuum from excess hexamethylene diisocyanate and those fractions of the monomeric diisocyanate which are more difficult to remove are thereafter eliminated under high vacuum in a thin-film evaporator. A golden yellow liquid polyisocyanate having a biuret structure is obtained, the yield being about 150 parts with an —NCO content of about 5.8%.

EXAMPLE 8

About 21.5 parts of the bis-chloroformic acid ester of 1,4-butylene glycol, dissolved in about 300 parts by volume of benzene, are introduced dropwise into about 200 parts of an $\omega,\omega'$-diamino propylene glycol polyether (average molecular weight about 1,000; —$NH_2$ content about 3.2%). Thereafter, hydrochlorides of the $\omega,\omega'$-diamino propylene glycol polyether comprising urethane groups are converted by dropwise introduction of methanilic sodium hydroxide solution into the free diamines and residual quantities of bis-chloroformic acid esters are reacted completely. The substance is filtered off from the sodium chloride which is formed and the reaction product is freed in vacuo from water, methanol and benzene. The clear reaction product is introduced dropwise under the conditions of Example 1 into about 400 parts of hexamethylene diisocyanate at about 90° C. and the temperature is finally raised for about one hour to about 130° C. A clear solution is obtained which consists of polyisocyanates with a biuret structure comprising urethane groups in excess hexamethylene diisocyanate. The —NCO content of the solution is about 27.8%. By further heating of the solution at about 130° C., the —NCO content falls to about 26.5% because of allophanate formation and polymerization reactions.

EXAMPLE 9

About 200 parts of a mixture of about 80% of $\omega,\omega'$-diamino propylene glycol polyether (—$NH_2$ content: about 1.38%, average molecular weight about 2400) and about 20% of a mixture of $\omega,\omega'$-dihydroxy propylene glycol polyether and $\omega$-hydroxy-$\omega'$-amino propylene glycol polyether (—OH content about 0.8%; —$NH_2$ content about 0.6%) are heated with about 15 parts of urea to a temperature of about 140° C. Ammonia is the thereby split off and the viscosity of the reaction mixture rises. The reaction mixture which is obtained and which consists of about 70% of $\omega,\omega'$-amino polyether comprising urethane groups is taken up in about 400 parts by volume of benzene. The substance is filtered off from about 2 parts of a difficulty soluble secondary product and the clear solution is introduced dropwise into about 460 parts of 1-methylbenzene-2,4-diisocyanate at about 90° C. Finally, the reaction mixture is heated for about one hour to about 130° C. A clear solution of polyisocyanates with a biuret structure is obtained, the said solution having an —NCO content of 28.4%.

EXAMPLE 10

About 200 parts of the $\omega,\omega'$-diamino propylene glycol polyether used in Example 9 are dissolved in about 400 parts of benzene and introduced dropwise at room temperature into a solution of about 250 parts of hexamethylene diisocyanate in about 500 parts of benzene while stirring vigorously. Thereafter, about another 300 parts of hexamethylene diisocyanate are added all at once to the reaction mixture. The mixture is heated for about one hour under reflux to boiling point and thereafter substantially freed at normal pressure from benzene. Finally, the solution is heated for about one hour to about 130° C. A clear solution is obtained, consisting of polyisocyanates with numerous biuret groups in hexamethylene diiscyanate. The —NCO content of the solution is about 26.9%.

EXAMPLE 11

About 200 parts of a polypropylene glycol polyether with about 3% of incorporated bis-(hydroxyethyl)-m-toluidine (—OH number about 56) are heated while stirring well with about 30 parts by weight of urea to about 140° C. By this means ammonia is split off. The reaction mixture is brought by further slow raising of the temperature to an internal temperature of about 190° C. and kept for four hours at this temperature, whereby copious amounts of $CO_2$ are split off as well as ammonia. After cooling the reaction product, the latter is taken up in 500 parts by volume of benzene and filtered off from relatively small quantities of insoluble fractions. The clear solution is introduced dropwise at about 90° C. into about 500 parts of 1-methylbenzene-2,4-diisocyanate and thereafter heated for about one hour to about 150° C. There is obtained a solution of polyisocyanates with a biuret structure, some of which also contains in addition urea and/or urethane groups, in excess 1-methylbenzenes-2,4-diisocyanate. The —NCO content of the solution is about 29.8%.

EXAMPLE 12

200 parts of a polyester prepared from adipic acid and ethylene glycol with the —OH number 58 and the acid number 1.1 are dehydrated for half an hour to 130° C./14 mm. Hg. When the temperature of the melt dropped down to 80° C. 200 parts of the purified biuret polyisocyanate having been obtained according to Example 1 and having an —NCO content of 5.1 percent are added. The reaction mixture is held while stirring for five minutes at 100° C. 0.2 parts of dibutyl-tin-dilaurate are added, the viscous reaction mixture is cast in thin layers onto a fabric consisting of either cotton or polyacrylo nitrile or terephthalic acid-ethylene-glycol-polyester. After heating for 24 hours to about 100° C. a crosslinked rubbery polyurethane coating is obtained on the fabric which adheres very well to the fabric and which exhibits a good stability against the influence of light and organic solvents.

EXAMPLE 13

100 parts of a polyester prepared from 3 mols of phthalic acid and 4 mols of trimethylol propane and having 10.1 percent OH are made into a paste with 100 parts of a mixture of equal parts of toluene, ethyl acetate, butyl acetate, glycol monomethyl ether acetate and 106.5 parts of titanium dioxide (Rutil). 179 parts of the above solvent mixture are once more added as well as 2 parts of polyvinyl methyl ether. 42 parts of the biuret polyisocyanate dissolved in an excess of hexamethylene diisocyanate prepared in accordance with Example 2 and having an —NCO content of 29.8 percent are added. The paste is used as a lacquer coating. After 30 hours standing the lacquer coating is resistent against organic solvents such as toluene and does not exhibit any yellowing in natural or artificial light.

It is to be understood that the foregoing working examples are given for the purpose of illustration and that any other suitable organic polyisocyanate, $\omega,\omega'$-diamino polyether or the like could have been used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention.

What is claimed is:

1. An organic polyether polyisocyanato biuret having up to six —NCO groups and having the formula

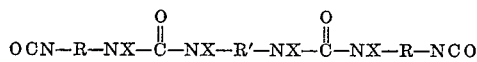

wherein R is an organic hydrocarbon radical selected from the group consisting of aliphatic, hydroaromatic, araliphatic and aromatic radicals, R' is a radial obtained by removing the —NH$_2$ groups from an $\omega,\omega'$-diamino polyether having a molecular weight of from 200 to 6,000 and wherein both terminal groups of the radical are —CH$_2$— groups after the removal of the —NH$_2$ groups and X is selected from the group consisting of hydrogen and —CO—NX—R—NCO.

2. The polyether polyisocyanato biuret of claim 1 wherein R is an aromatic radical obtained by removing the —NCO groups from an aromatic diisocyanate.

3. The polyether polyisocyanato biuret of claim 1 wherein R is obtained by removing the —NCO groups from an aliphatic diisocyanate.

4. An organic polyether polyisocyanato biuret having up to six —NCO groups and having the formula

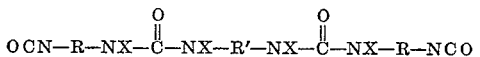

wherein R is the organic radical left after the removal of the two —NCO groups from an organic diisocyanate selected from the group consisting of 1-methylbenzene-2,4-diisocyanate, 1-methylbenzene-2,6-diisocyanate, 1-methoxybenzene-2,4-diisocyanate, 1-chlorobenzene-2,4-diisocyanate, diphenylmethane-4,4'-diisocyanate, p-phenylene dissocyanate, m-phenylene diisocyanate, hexamethylene diisocyanate, cyclohexylene-1,4-diisocyanate, dicyclohexyl-4,4'-diisocyanate, tetramethylene diisocyanate, diisocyanatomethyl cyclobutane, 1,3-bis($\gamma$-isocyanatopropoxy)-2,2-dimethylpropane and mixtures thereof, R' is the radical obtained by removing the —NH$_2$ groups from an $\omega,\omega'$-diamino polyether having a molecular weight of from about 200 to about 6,000 and wherein both terminal groups of the radical are —CH$_2$— groups after the removal of the —NH$_2$ groups and X is selected from the group consisting of hydrogen and —CO—NX—R—NCO.

5. The polyether polyisocyanato biuret of claim 4 wherein at least 2 of the radicals represented by X are —CO—NH—R—NCO.

6. The polyether polyisocyanato biuret of claim 4 wherein R' is obtained by removing the —NH$_2$ groups from an $\omega,\omega'$-diamino polypropylene ether.

7. The organic polyether polyisocyanato biuret of claim 4 having the formula

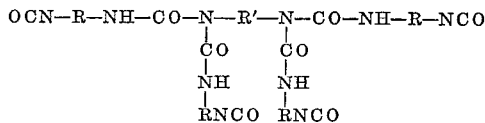

8. A process for the preparation of an organic polyether polyisocyanato biuret of claim 4 which comprises reacting at a temperature above 15° C. an $\omega,\omega'$-diamino polyether with an organic polyisocyanate in such proportions that at least 3 mols of organic polyisocyanate are present per mol of said $\omega,\omega'$-diamino polyether and by adding small proportions of said $\omega,\omega'$-diamino polyether to said organic polyisocyanate while vigorously agitating the reaction mixture.

9. The process of claim 8 wherein the reaction components are substantially free from metal catalysts and ammonia.

10. The process of claim 8 wherein the reaction components are maintained under a blanket of inert gas.

11. The process of claim 8 wherein the reaction components are heated to a temperature of from about 80 to about 100° C.

12. The process of claim 8 wherein said $\omega,\omega'$-diamino polyether is $\omega,\omega'$-diamino polyoxypropylene ether.

13. The process of claim 8 wherein said organic polyisocyanate has 2 free —NCO groups.

14. The process of claim 8 wherein said organic polyisocyanate is a monomeric organic diisocyanate.

15. A process for the preparation of an organic polyether polyisocyanato polybiuret of claim 4 which comprises reacting an organic diisocyanate with an $\omega,\omega'$-diamino polyether having a molecular weight of from about 200 to about 6,000 in such proportions that there are at least 3 mols of organic diisocyanate present in the reaction mixture for each mol of said $\omega,\omega'$-diamino polyether at a temperature of from about 15° C. to about 160° C.

16. The process of claim 15 wherein said temperature is in the range of from about 80 to about 160° C.

17. The process of claim 15 wherein there are at least 20 mols of said organic diisocyanate present per mol of said $\omega,\omega'$-diamino polyether.

18. A process for the preparation of an organic polyether polyisocyanato biuret of claim 4 which comprises reacting an $\omega,\omega'$-diamino polyether with an organic monoisocyanate in a first step to prepare an initial product in the ratio of about 1 mol of $\omega,\omega'$-diamino polyether to about 2 mols of said organic monoisocyanate and subsequently reacting said initial product with at least 2 mols of an organic diisocyanate at a temperature of from about 15° C. to about 160° C. to prepare said organic polyether polyisocyanato biuret.

References Cited

UNITED STATES PATENTS

| | | | |
|---|---|---|---|
| 3,256,213 | 6/1966 | Gmitter et al. | 260—2.5 |
| 3,124,605 | 3/1964 | Wegner | 260—453 |
| 3,179,606 | 4/1965 | Prescott et al. | 260—2.5 |
| 3,180,883 | 4/1965 | Case | 260—453 |
| 3,044,989 | 7/1962 | Shivers | 260—77.5 |

CHARLES B. PARKER, *Primary Examiner.*

DOLPH H. TORRENCE, *Assistant Examiner.*

U.S. Cl. X.R.

260—2.5 75, 77.5, 583, 584, 561, 471, 482; 117—132, 148, 161.

U.S. DEPARTMENT OF COMMERCE
PATENT OFFICE
Washington, D.C. 20231

UNITED STATES PATENT OFFICE
CERTIFICATE OF CORRECTION

Patent No. 3,441,588                        April 29, 1969

Kuno Wagner et al.

It is certified that error appears in the above identified patent and that said Letters Patent are hereby corrected as shown below:

Column 3, line 9, "reached" should read -- reacted --; line 41, "fullers" should read -- fuller --. Column 4, line 24, that portion of the formula reading "$(H_3H_6O)_n$" should read -- $(C_3H_6O)_n$ --; line 46, "m-penylene" should read -- m-phenylene --. Column 5, line 57, "cur" should read -- curs --. Column 9, line 20, "butene" should read -- butyne --. Column 10, line 4, "oragnic" should read -- organic --; same line 4, "polyioccyanate" should read -- polyisocyanate --; line 25, "cellural" should read -- cellular --.

Signed and sealed this 31st day of March 1970.

(SEAL)
Attest:

Edward M. Fletcher, Jr.                      WILLIAM E. SCHUYLER, JR.
Attesting Officer                                  Commissioner of Patents